Sept. 4, 1923.

G. A. LYON 1,466,882

VEHICLE BUFFER DEVICE

Filed Oct. 5, 1921

INVENTOR
George Albert Lyon
BY
Harry L. Duncan
ATTORNEY.

Patented Sept. 4, 1923.

1,466,882

UNITED STATES PATENT OFFICE.

GEORGE ALBERT LYON, OF PHILADELPHIA, PENNSYLVANIA.

VEHICLE BUFFER DEVICE.

Application filed October 5, 1921. Serial No. 505,463.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Vehicle Buffer Devices, of which the following is a specification taken in connection with accompanying drawing.

This invention relates to buffer or bumper devices for automobiles or other vehicles in which plates of spring steel or other suitable metal are slit or cut so as to form a series of vertically separated strips or members, some of which may be used as the buffer front strips or members, and adjustably or otherwise connected together, if desired, so as to form a double strength reinforced buffer front throughout the central part of the buffer between the automobile frame members. Some of these integrally connected strips stamped or cut from such plates may be bent inward and rearward to form attaching strips or members 25 and may be given any suitable shape and construction so as to most conveniently and effectively secure them to the automobile frame. In some cases the attaching strips may be forced or spread apart edgewise from the connected buffer front strips; so that, if desired, several inches of clearance can be secured in this manner, and it is usually desirable to have the buffer end somewhat reduced or rounded to decrease the weight and also to give increased resilience and a more pleasing appearance to this part of the buffer. In some cases also several vertically separated front strips may be cut or stamped out of a single plate of such spring steel material and preferably connected to an intermediate rearwardly bent attaching member or strip which may be directly or indirectly connected to the vehicle frame.

In the accompanying drawings showing in a somewhat diagrammatic way various illustrative embodiments of the invention—

Fig. 1 is a perspective view of one form of buffer.

Fig. 2 is a plan view of the corresponding spring steel blank showing the way in which the parts may be formed or cut out.

Figure 1:
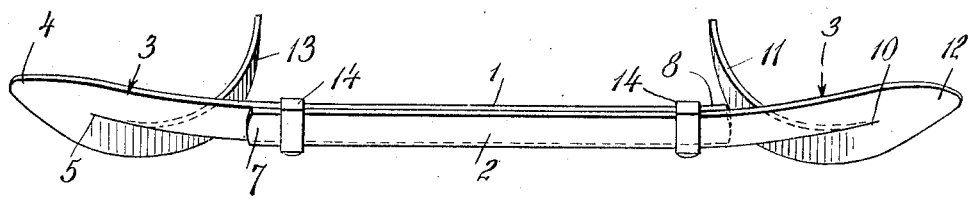

In the form of buffer shown in Fig. 1 the front strips or impact receiving members 1, 2 may be substantially horizontal or level, if desired, and are preferably substantially straight throughout their overlapping portions between the strip ends 7, 8; these overlapping portions being adjustably or otherwise connected as by the clips or connecting devices 14. These front strips may be bent backward somewhat outside of these overlapping portions, and for example, the strip 1 may have its outer portion 3 bent or curved back so as to merge into the reduced or tapered buffer end 4 which may rounded on its tip as indicated. The buffer end is preferably integral with the vertically separated attaching strip or member 13 which may be bent backward from about the point or line of separation 5 so as to give a resilient support to the reinforced front strips, and also preferably to hold them in somewhat elevated position as is desirable in many cases. The corresponding front strip 2 may have a similarly rearwardly curved or bent outer portion 3, communicating with the reduced rounded end 12 and with the integral lower or vertically separated attaching member 13.

Figure 2:
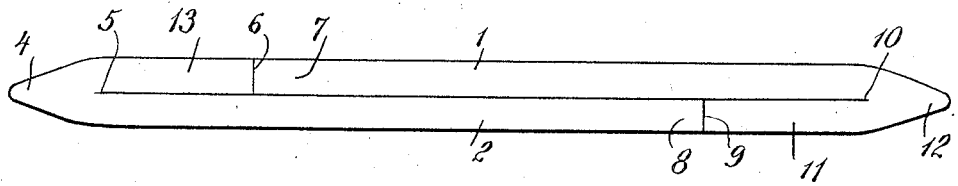

This desirable form of resilient buffer may be conveniently and cheaply made from sheet metal blanks, such as shown in Fig. 2; and these blanks may be preliminarily cut out in a suitable press or otherwise from the desired spring steel stock about a quarter to three-eighths of an inch thick more or less, and four to seven inches wide or so at the widest part. The blank where the greatest economy of stock is desired may be punched or otherwise severed along the longitudinal cut or line of severance 5—10 and simultaneously or otherwise cut transversely as at the longitudinally separated points 6—9. The blank is thus severed into two parts, each of which has one long strip or member 1, 2 and a vertically separated shorter strip or member 11, 13; the length of these different parts being, of course, so chosen as to give the desired lengths in the attaching strips and front strips of the buffer. Then the separated and slit blank sections may be bent, hardened and tempered and finished in any suitable way as by grinding processes before the final nickel-plating, enamel or other surface finish is given thereto. Of course, the main cutting, bending and shaping operations are more effectively done when the metal is hot and in some cases more or less of these shaping processes may be performed at the same heat at which the blank sections are finally hardened for tempering.

Figure 3:
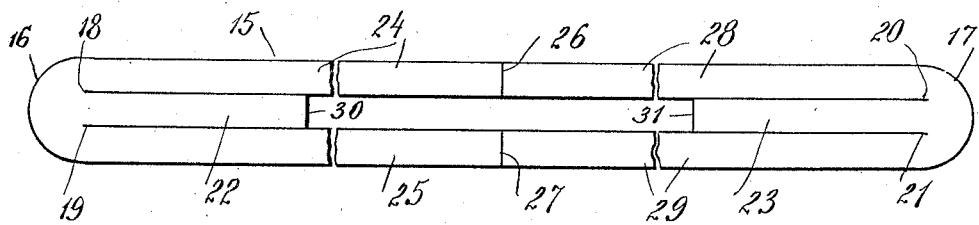
Fig. 3 is a similar view showing another form of blank.
Figure 4:
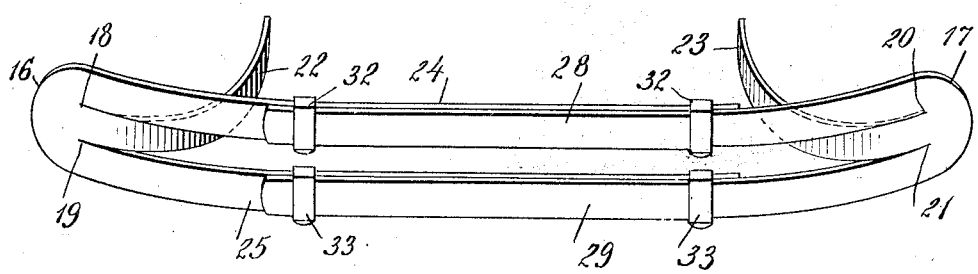
Fig. 4 is a perspective view of the corresponding buffer which may be made therefrom.

Fig. 3 shows another illustrative style or type of blank which may have reduced or rounded ends 16, 17 and be correspondingly wider where three or more vertically separated buffer sections are formed from the same strip of material. Where three strip sections are formed, the blank may be six or nine inches wide, a suitable width spring steel rolled stock which preferably has rounded edges being advisable for this purpose. Several longitudinal cuts or lines of severance 18—20 and 19—21 may be formed in the blank and a series of transverse cuts or lines of severance 26—27 and 30—31 may be made by any suitable stamping or cutting device. In this case the blank is considerably longer than the complete buffer front since after bending back the intermediate strips or tongues 22—23 for instance and curving more or less the adjacent portions of the other vertically separated strips, they are arranged in overlapping position as indicated in Fig. 4, the upper front strips 24—28 overlapping throughout a considerable distance if desired and being adjustably or otherwise held by any suitable clamping or connecting devices such as the Lyon type enclosing clips 32. The lower front strips or contact members 25—29 may similarly overlap if desired and may be adjustably or otherwise connected by the clips 33 so that a double height contact face is provided on the buffer which has a desirable appearance and may be quickly and readily manufactured with very small percentage of waste stock. The buffer units may in this case be similarly hardened, tempered, polished and finished; and they may be shipped in assembled condition or preferably in more or less nested closely packed condition where one set of front strips may closely overlap the other to form a relatively small package.

This invention has been described in connection with a number of embodiments, forms, proportions, parts, arrangements, materials, methods of manufacture, connection and use, to the details of which disclosure the invention is not of course to be limited, since what is claimed as new and what is desired to be secured by Letters Patent is set forth in the appended claims:

1. The automobile buffer comprising two similar units of tempered spring steel plate, said units comprising bent attaching strips and relatively long front strips vertically separated from said attaching strips and integrally connected therewith through the reduced ends of said bumper units, said front strips being connected in overlapping position.

2. The automobile buffer comprising two units of tempered spring steel plate, said units comprising bent attaching strips and relatively long front strips integrally connected therewith through the reduced ends of said bumper units, said front strips being connected.

3. The automobile buffer comprising two similar units of tempered spring steel plate, each formed with a rearwardly and inwardly bent attaching strip and comprising a relatively long vertically separated front strip integrally connected to said attaching strip by a reduced rounded bumper end and adjustable connecting devices to clamp together the overlapping portions of the corresponding front strips adjacent the central part of the buffer to form a reinforced contact member vertically separated from said attaching loops.

4. The automobile buffer comprising two similar units of tempered spring steel plate, each formed with a rearwardly bent attaching strip and comprising a relatively long vertically separated front strip integrally connected to said attaching strip by a bumper end and connecting devices to clamp together the overlapping portions of the corresponding front strips adjacent the central part of the buffer to form a reinforced contact member vertically separated from said attaching loops.

5. The automobile buffer comprising a plurality of units of spring steel plate, said units comprising attaching strips and relatively long front strips vertically separated from said attaching strips and integrally connected therewith through the reduced ends of said bumper units, said front strips being connected in overlapping position.

6. The automobile buffer comprising a plurality of units of spring steel plate, said units comprising attaching strips and vertically displaced front strips connected therewith through the ends of said bumper units, said front strips being connected.

7. The automobile buffer comprising two similar units of tempered spring steel plate, said units comprising bent attaching strips and relatively long front strips vertically separated from said attaching strips and integrally connected therewith through the tapered rounded ends of said bumper units, said front strips being arranged in overlapping position and adjustably connected, said units being formed from a blank having strips divided, except at the ends of the blank, by longitudinal lines of severance and one of said attaching strips and one of said relatively long front strips of said units being formed from one of the strips of said blank.

8. The automobile buffer comprising two units of tempered spring steel plate, said units comprising bent attaching strips and relatively long front strips vertically separated from said attaching strips and integrally connected therewith through the ends of said bumper units, said front strips being arranged in overlapping position, said units being formed from a blank having strips divided, except at the ends of the blank, by longitudinal lines of severance and one of said attaching strips and one of said relatively long front strips of said units being formed from one of the strips of said blank.

9. The two buffer units of tempered spring steel plate, and adapted to be connected with their front strips in overlapping position to form a buffer, said units comprising bent attaching strips and relatively long front strips vertically separated from said attaching strips and integrally connected therewith through the rounded ends of said bumper units, said units being formed from a blank having longitudinal strips divided except at the ends of the blank by longitudinal lines of severance and a plurality of the strips of said units being formed from one of the longitudinal strips of said blank.

10. The two buffer units of tempered spring steel plate and adapted to be connected with their front strips in overlapping position to form a buffer, said units comprising attaching strips and relatively long front strips vertically separated from said attaching strips and integrally connected therewith through the ends of said bumper units, said units being formed from a blank having longitudinal strips divided except at the ends of the blank, and a plurality of the strips of said units being formed from one of the longitudinal strips of said blank.

11. The automobile buffer comprising two similar units each formed from a tempered spring steel plate and provided with a rearwardly and inwardly bent attaching strip and with a relatively long vertically separated front strip integrally connected to said attaching strip and connected devices to clamp together the cooperating portions of the corresponding front strips adjacent the central part of the buffer to form a multiple strip contact member vertically separated from said attaching strips.

12. The automobile buffer comprising two units each formed from a tempered spring steel plate and provided with a rearwardly and inwardly bent attaching strip and with a vertically separated front strip integrally connected to said attaching strip and connecting devices to clamp together the cooperating portions of the corresponding front strips to form a multiple strip contact member vertically separated from said attaching strips.

13. The automobile buffer comprising two spring steel plate elements, each formed with a rearwardly extending attaching strip and with a vertically separated front strip connected to said attaching strip and connecting devices to connect the cooperating portions of the front strips to form a reenforced multiple contact member.

14. The automobile buffer comprising two steel plate elements, each formed with a rearwardly extending attaching strip and with a vertically separated front strip and connecting devices to connect the front strips to form a multiple contact member.

GEORGE ALBERT LYON.